US010713354B2

(12) United States Patent
Chen et al.

(10) Patent No.: US 10,713,354 B2
(45) Date of Patent: Jul. 14, 2020

(54) METHODS AND APPARATUS TO MONITOR PERMISSION-CONTROLLED HIDDEN SENSITIVE APPLICATION BEHAVIOR AT RUN-TIME

(71) Applicant: Samsung Electronics Co., Ltd., Suwon-si (KR)

(72) Inventors: Xun Chen, Mountain View, CA (US); Seonghun Moon, Suwon (KR); HyungDeuk Kim, Suwon (KR); Jisu Kim, Suwon (KR)

(*) Notice: Subject to any disclaimer, the term of this patent is extended or adjusted under 35 U.S.C. 154(b) by 184 days.

(21) Appl. No.: 15/870,619

(22) Filed: Jan. 12, 2018

(65) Prior Publication Data

US 2019/0034624 A1   Jan. 31, 2019

Related U.S. Application Data

(60) Provisional application No. 62/537,949, filed on Jul. 27, 2017.

(51) Int. Cl.
  *G06F 21/55* (2013.01)
  *G06F 21/44* (2013.01)
  *G06F 21/57* (2013.01)

(52) U.S. Cl.
  CPC .......... *G06F 21/55* (2013.01); *G06F 21/44* (2013.01); *G06F 21/577* (2013.01); *G06F 2221/2141* (2013.01)

(58) Field of Classification Search
  CPC .. G06F 21/44; G06F 21/55; G06F 2221/2141; G06F 21/577; H04L 2463/102; H04L 63/08; H04L 63/123
  See application file for complete search history.

(56) References Cited

U.S. PATENT DOCUMENTS 8,281,410 B1* 10/2012 Sobel .................. G06F 21/51
                                                                 726/1
8,763,080 B2*  6/2014 Carrara ............... G06F 21/44
                                                                 726/2

(Continued)

FOREIGN PATENT DOCUMENTS

JP          4624181 B2    11/2010
KR     10-1456489 B1    10/2014

(Continued)

OTHER PUBLICATIONS

ISA/KR, International Search Report and Written Opinion of the International Search Authority for International Application No. PCT/KR2018/008571, dated Oct. 25, 2018, 9 pages.

(Continued)

*Primary Examiner* — Trang T Doan

(57) ABSTRACT

An apparatus includes a display, a processor coupled to the display and a memory coupled to the processor, wherein the memory includes instructions executable by the processor to identify an access attempt to a monitored resource by an application, the identification occurring after an access permission check is performed. The memory further includes instructions executable by the processor to determine whether the access attempt involves suspicious activity by evaluating a potential risk associated with the application accessing the monitored resource, and in response to determining that the access attempt involves suspicious activity to provide a graphical user interface (GUI) to the display, the GUI providing a notification of the access attempt.

17 Claims, 8 Drawing Sheets

(56) References Cited

U.S. PATENT DOCUMENTS

| | | | |
|---|---|---|---|
| 9,069,706 B2 | 6/2015 | Sriram et al. | |
| 2004/0010701 A1 | 1/2004 | Umebayashi et al. | |
| 2006/0090192 A1* | 4/2006 | Corby | G06F 21/51 |
| | | | 726/1 |
| 2009/0094676 A1 | 4/2009 | Burugula et al. | |
| 2010/0064289 A1 | 3/2010 | Oe et al. | |
| 2010/0131512 A1* | 5/2010 | Ben-Natan | G06F 21/6227 |
| | | | 707/741 |
| 2011/0047594 A1* | 2/2011 | Mahaffey | G06F 21/564 |
| | | | 726/1 |
| 2012/0255021 A1* | 10/2012 | Sallam | G06F 21/564 |
| | | | 726/25 |
| 2014/0013429 A1 | 1/2014 | Lu | |
| 2015/0281238 A1* | 10/2015 | Ramachandran | G06F 21/51 |
| | | | 726/4 |
| 2016/0180089 A1 | 6/2016 | Dalcher | |
| 2017/0118611 A1* | 4/2017 | Schieman | H04W 68/005 |

FOREIGN PATENT DOCUMENTS

| | | |
|---|---|---|
| KR | 10-2016-0071993 A | 6/2016 |
| KR | 10-1666176 B1 | 10/2016 |

OTHER PUBLICATIONS

Extended European Search Report regarding Application No. 18839111.4, dated Mar. 25, 2020, 6 pages.

\* cited by examiner

METHODS AND APPARATUS TO MONITOR PERMISSION-CONTROLLED HIDDEN SENSITIVE APPLICATION BEHAVIOR AT RUN-TIME

CROSS-REFERENCE TO RELATED APPLICATION AND CLAIM OF PRIORITY

This application claims priority under 35 U.S.C. § 119(e) to U.S. Provisional Patent Application No. 62/537,949 filed on Jul. 27, 2017. The above-identified provisional patent application is hereby incorporated by reference in its entirety.

TECHNICAL FIELD

This disclosure relates generally to security on electronic devices and management of the permissions granted to applications running on electronic devices to access device resources, including without limitation, the devices' cameras and microphones. More specifically, this disclosure relates to systems and methods for monitoring suspicious application access.

BACKGROUND

Electronic devices running applications manage permissions for applications to access the electronic devices' resources, such as the devices' cameras or microphones. The management of such permissions may be defined according to a permission set at the time of the application's installation on the electronic device or at a subsequent runtime. The initially set permission may create opportunities for the application to access resources under circumstances unforeseen or undesired by the user at the time the permission was initially set by a user. For example, a user of a mobile terminal may, at the time of installing a social media application, grant the application permission to access the mobile terminal's microphone, on the assumption that the application would only access the microphone when the social media application was open and actively being used by the user. However, in some cases, the application may abuse this permission and access the microphone under unwanted circumstances, such as while the application is only running as a background process, which can result in undesirable breaches of a user's privacy, for example, recording the user's conversations without her permission.

SUMMARY

This disclosure provides systems and methods for monitoring suspicious application access.

In a first embodiment, there is an apparatus which includes a display, a processor coupled to the display and a memory coupled to the processor, wherein the memory includes instructions executable by the processor to identify an access attempt to a monitored resource by an application, the identification occurring after an access permission check is performed. The memory further includes instructions executable by the processor to determine whether the access attempt involves suspicious activity by evaluating a potential risk associated with the application accessing the monitored resource, and in response to determining that the access attempt involves suspicious activity to provide a graphical user interface (GUI) to the display, the GUI providing a notification of the access attempt.

In a second embodiment, there is a method for resource access monitoring, wherein the method includes the step of performing an identification, by a processor connected to a memory and a display, an access attempt to a monitored resource by an application, wherein the step of identifying occurs after an access permission check has been performed. The method further includes the step of determining, whether the access attempt involves suspicious activity by evaluating a potential risk associated with the application accessing the monitored resource. Additionally, the method includes the step of, in response to determining that the access attempt involves suspicious activity, providing a graphical user interface (GUI) to the display, the GUI providing a notification of the access attempt.

In a third embodiment, there is a non-transitory computer-readable medium including program code which, when executed by a processor, causes a system to identify an access attempt to a monitored resource by an application, the identification occurring after an access permission check has been performed. The program code, when executed by a processor, additionally causes the system to determine whether the access attempt involves suspicious activity by evaluating a potential risk associated with the application accessing the monitored resource, and in response to determining that the access attempt involves suspicious activity, provides a graphical user interface (GUI) to a display, the GUI providing a notification of the access attempt.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 8, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
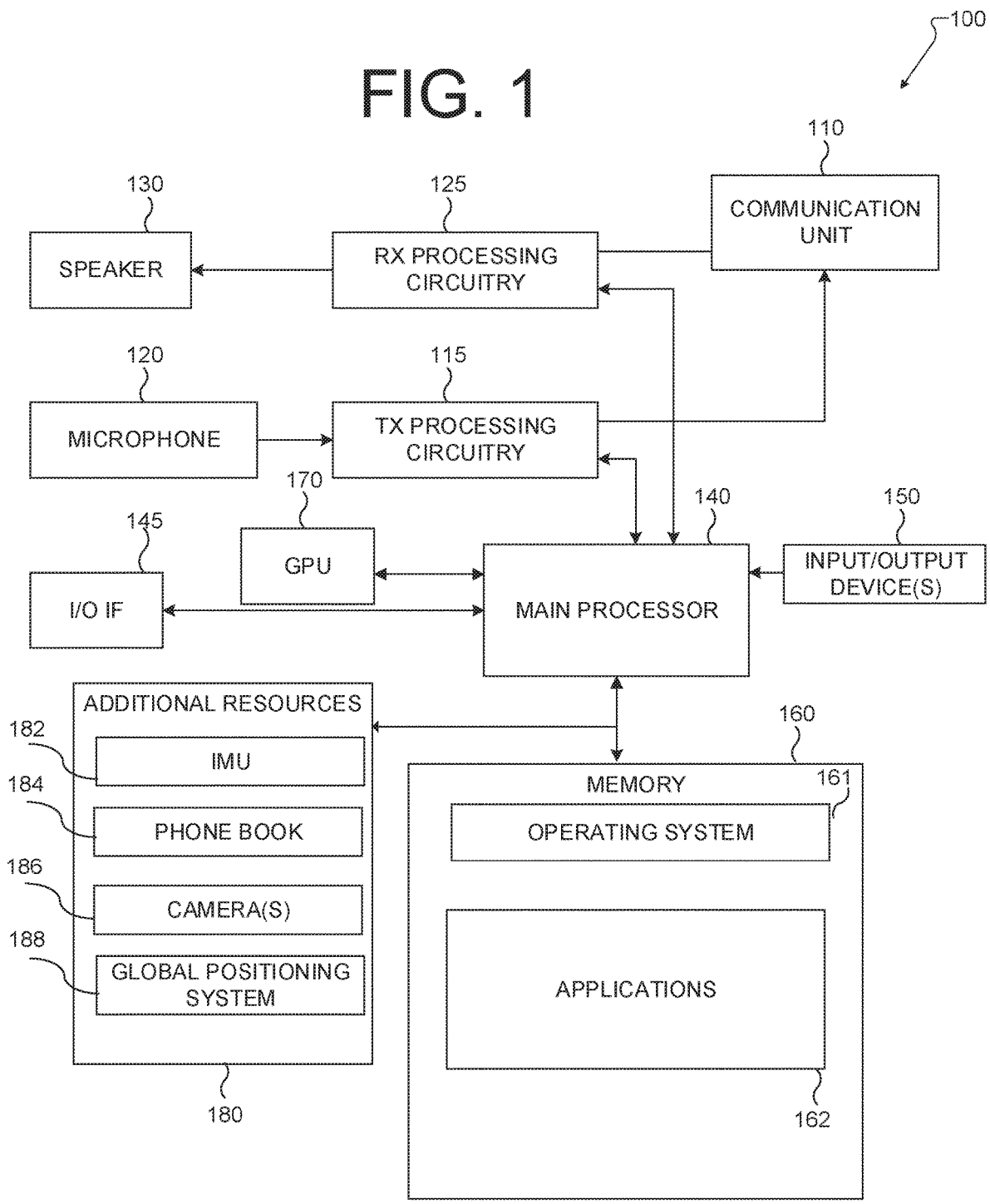
FIG. 1 illustrates an example of an electronic device according to this disclosure.

FIG. 1 illustrates an example of a device for implementing monitoring of suspicious application access according to this disclosure. The embodiment of device 100 illustrated in FIG. 1 is for illustration only, and other configurations are possible. However, suitable devices come in a wide variety of configurations, and FIG. 1 does not limit the scope of this disclosure to any particular implementation of a device.

As shown in FIG. 1, the device 100 includes a communication unit 110 that can include, for example, a radio frequency (RF) transceiver, a Bluetooth® transceiver, or a Wi-Fi® transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes an operating system (OS) program 161 and one or more applications 162.

Applications 162 can include games, social media applications, applications for geotagging photographs and other items of digital content, virtual reality (VR) applications, augmented reality (AR) applications, operating systems, device security (e.g., anti-theft and device tracking) applications or any other applications which access resources of device 100, the resources of device 100 including, without limitation, speaker 130, microphone 120, input/output devices 150, and additional resources 180. Further, applications 162 can include applications containing program code that when executed by a processor, such as main processor 140, cause the processor to perform steps of methods for monitoring suspicious application access according to certain embodiments of the present disclosure.

The communication unit 110 can receive an incoming RF signal, for example, a near field communication signal such as a BLUETOOTH or WI-FI signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data).

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100, or legacy applications developed for earlier platforms. Additionally, main processor 140 can be manufactured to include program logic for implementing methods for monitoring suspicious application access according to certain embodiments of the present disclosure. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, touch screens, mouse(s), track balls or other devices capable of acting as a user interface to allow a user to interact with electronic device 100. In some embodiments, input/output device(s) 150 can include a touch panel, a virtual reality headset, a (digital) pen sensor, a key, or an ultrasonic input device.

Input/output device(s) 150 can include one or more screens, which can be a liquid crystal display, light-emitting diode (LED) display, an optical LED (OLED), an active matrix OLED (AMOLED), or other screens capable of rendering graphics.

The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1.

For example, according to certain embodiments, device 100 can further include a separate graphics processing unit (GPU) 170.

According to certain embodiments, electronic device 100 can include a variety of additional resources 180 which can, if permitted, be accessed by applications 162. According to certain embodiments, additional resources 180 include an accelerometer or inertial motion unit 182, which can detect movements of the electronic device along one or more degrees of freedom. Additional resources 180 include, in some embodiments, a user's phone book 184, one or more cameras 186 of electronic device 100, and a global positioning system 188.

Although FIG. 1 illustrates one example of a device 100 for implementing monitoring of suspicious application access, various changes can be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
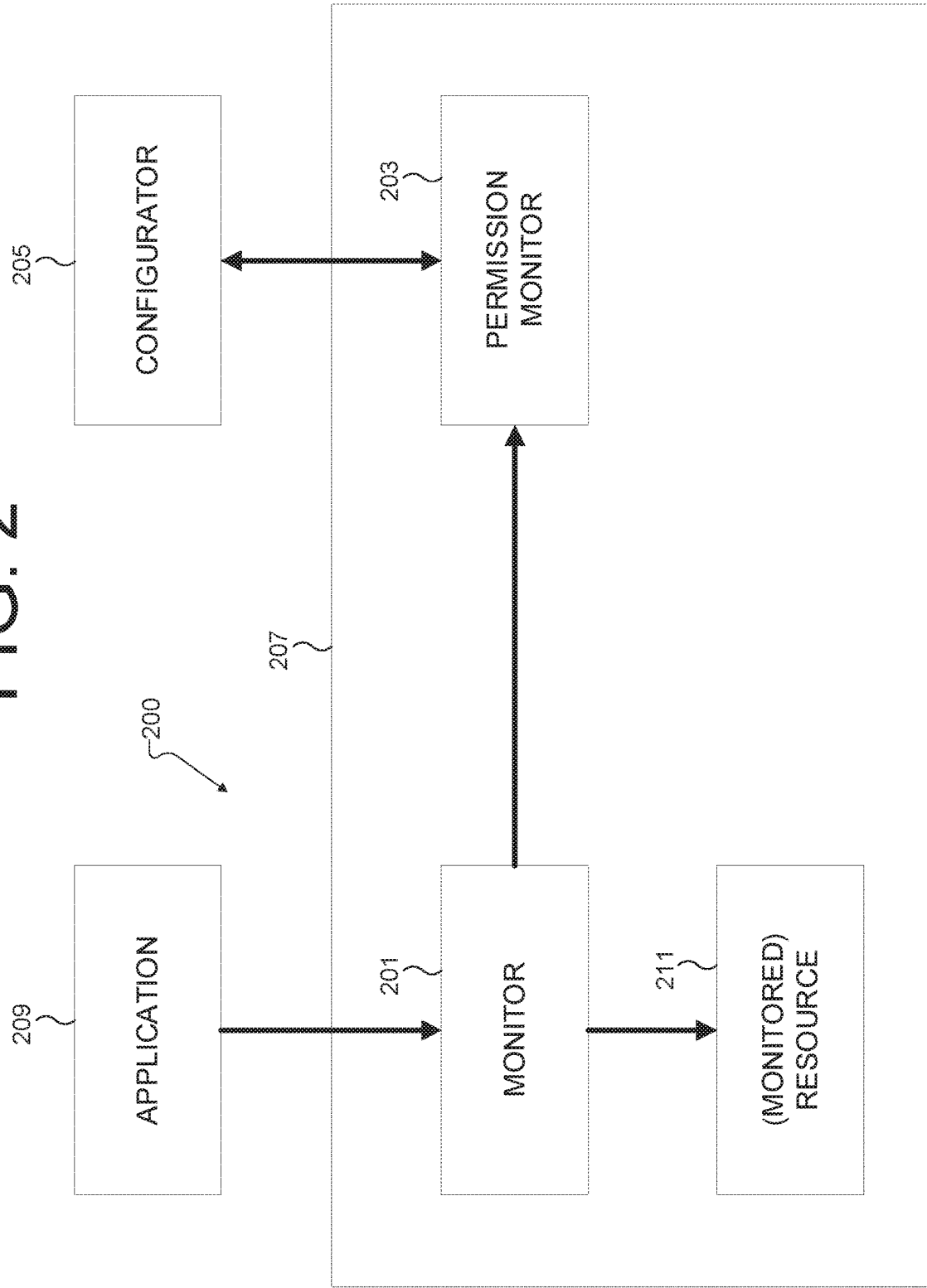
FIG. 2 illustrates an example of a block diagram of the components of a system for monitoring suspicious application access according to this disclosure.

FIG. 2 illustrates an example of a block diagram of the components of a system for monitoring suspicious application access according to this disclosure.

According to some embodiments, the components of a system for monitoring suspicious application access include a monitor 201, a permission monitor 203 and a configurator 205. Each of monitor 201, permission monitor 203 and configurator 205 can be implemented on a device (such as device 100 of FIG. 1) via hardware or software. According to some embodiments, monitor 201 and permission monitor 203 can be implemented one or more layers 207 in the protocol stack of the device below the application layer. In the illustrative example of FIG. 2, monitor 201 and permission monitor 203 operate at lower layers 207, while configurator 205 operates on the application layer, above lower layers 207.

In some embodiments, one or more applications 209 are running on an electronic device. Applications 209 include, without limitation, social media applications, games, photo and video editing applications, voice over internet protocol (VOW) call applications, and map or navigational applications. Each of applications 209 can be permitted access to one or more resource 211 of the device. Resource 211 can include, without limitation, the device's camera, fingerprint sensor, global positioning system sensor, phone book containing a device user's contacts, and the device's microphone.

According to some embodiments, when an application 209 is first installed on the electronic device, the operating system of the device will prompt the user to grant or deny application 209 permission to one or more resources 211. For example, a user of a mobile device, such as a smartphone, can install a social media application and grant it permission to access the camera the smartphone's camera. According to certain embodiments, each time the social media application attempts to access the camera, the operating system determines whether the social media application was, at the time of installation, granted permission to access the camera, and if so, permits the social media application to access the camera. According to other embodiments, the operating system determines whether the social media application requested permission to access the camera at a runtime after installation. According to certain embodiments, an ongoing monitoring functionality is provided, and the security risks associated with an application utilizing the user's permission for the application to access the camera in contexts beyond the intended scope of user's permission (for example, when the application is open, but the camera functionality has not been selected, or when the application is running as a background process) are reduced.

However, depending on the operating system of the electronic device, the social media application can retain its permission to access the smartphone's camera almost indefinitely, without requiring any further confirmation by the user as to the scope of the application's permission to access the camera. To revoke the social media application's permission to access the smartphone's camera, a user may, depending on the operating system of the electronic device, have to uninstall the application, or manually revoke the social media application's permission to access the camera. However, many users are not aware of the scope and/or duration of such applications' permission to access the camera. As such, social media applications and other applications can abuse the user's initial grant of permission to cameras and other device resources by, for example, accessing the resource without a user prompt, or as a background process. This can lead to, for example, the application recording the user's conversations without the user's knowledge or accessing the user's location information without the user's knowledge.

To decrease the risk of application 209 abusing the permissions to resource 211 set by the operating system of the device at the time of installation or at a post-installation runtime, monitor 201 resides on the one or more critical access paths between application 209 and resource 211, thereby making resource 211 a monitored resource. According to certain embodiments, monitor 201 is configured to identify that application 209 is attempting to access resource 211, and that the operating system has confirmed that application 209 was, at the time of its installation or at a post-installation runtime, given permission to access resource 211, and granted the operating system's permission to access resource 211. In response to identifying, subsequent to an initial access permission check performed by the operating system, an access attempt by application 209, monitor 201 calls permission monitor 203, to report the access attempt. Permission monitor 203 determines whether the access attempt by application 209 involves suspicious activity by evaluating the potential risk associated with the attempt by application 209 to access monitored resource 211. According to certain embodiments of the present disclosure, and as will be described in greater detail herein, permission monitor 203 evaluates the potential risk associated with the access attempt based on, for example, pre-defined rules and contextual information regarding the access attempt. According to some embodiments, multiple monitors 201 can be implemented on a single device, with each monitor 201 corresponding to an access permission for a resource on the device.

According to some embodiments, permission monitor 203 is configured to interface with configurator 205. Configurator 205 which can be implemented by software, hardware or a combination thereof, is configured to receive notice from permission monitor 203 that application 209's access attempt to resource 211 involves suspicious activity, to provide a graphical user interface (GUI) to a display (such as a display among input/output devices 150 shown in FIG. 1) providing a notification of the access attempt. According to some embodiments, the GUI provided by configurator 205 also is configured to receive inputs selecting one or more courses of action (e.g., allowing access to the resource, denying access to the resource, reporting the access attempt, etc.)

Although FIG. 2 illustrates one example of a block diagram of a system for monitoring suspicious application access, various changes can be made to FIG. 2. For example, monitor 201 and/or permission monitor 203 may operate on other levels of the device's protocol stack. Alternatively, monitor 201 and permission monitor 203 can be combined in a single component of the system.

Figure 3:
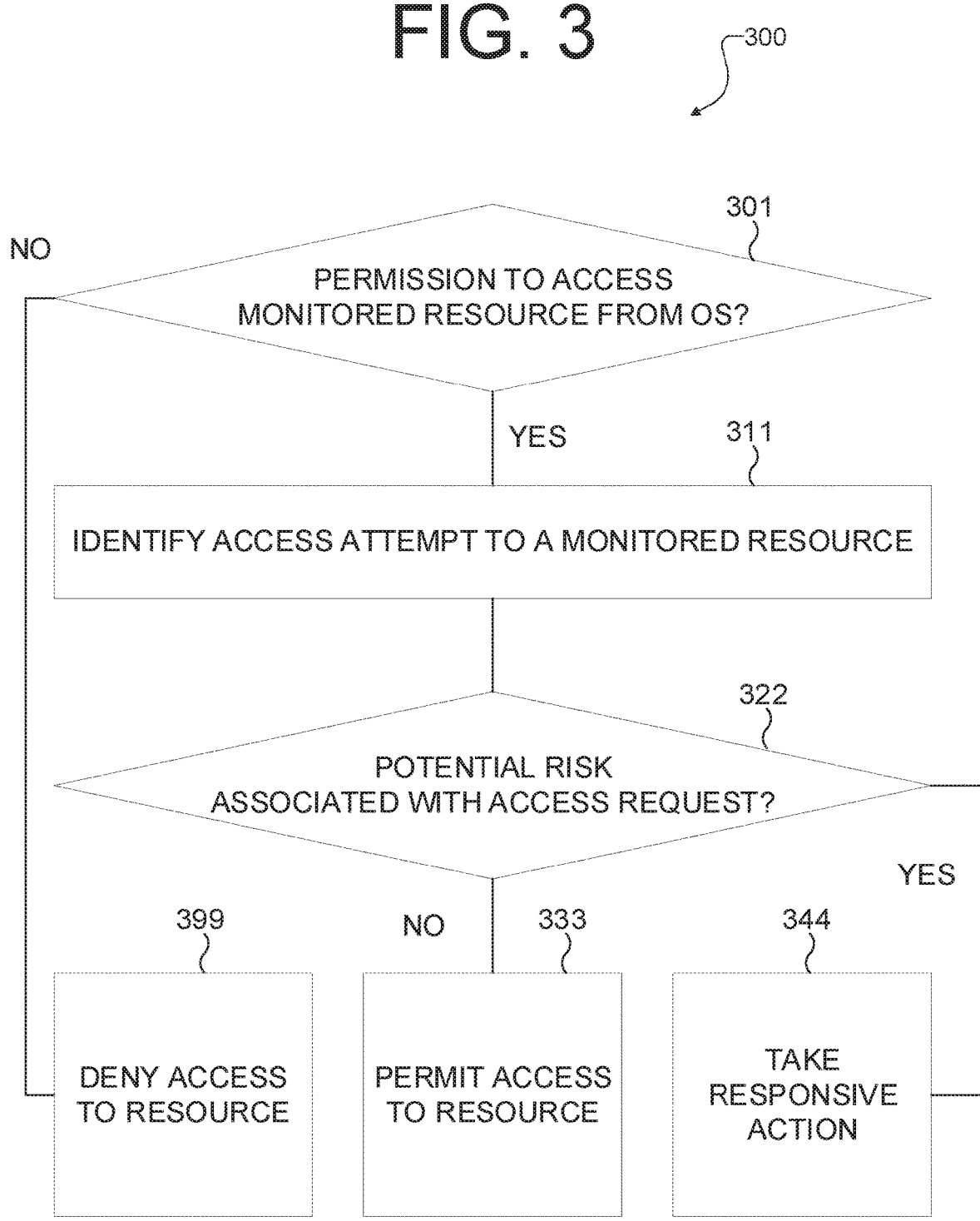
FIG. 3 illustrates an example of a flowchart showing operations of a method for monitoring suspicious application access according to this disclosure.

FIG. 3 illustrates, in flowchart form, operations of an exemplary method 300 for monitoring suspicious application access on an electronic device according to this disclosure.

In the example of FIG. 3, at operation 301, a device, (such as device 100 shown in FIG. 1) performs an initial determination of whether an application running on the device has been granted permission to access a resource on the device, such as a phone book, location information, camera, etc. According to some embodiments, operation 301 is performed by the operating system of the device at runtime for the application, and the determination is based on permissions set by the user at the time the application was installed, or in response to a post-installation request by the application. According to certain embodiments, the determination performed in operation 301 is based on permissions updated by the user through a "settings" menu at some time after the application was installed. If, at operation 301, it is determined that the application does not have a pre-set permission to access the monitored resource, the method proceeds to operation 399, and the application is denied access to the monitored resource.

According to certain embodiments, if it is determined at operation 301 that the application has previously been granted permission to access the monitored resource, the method proceeds to operation 311. At operation 311, the application attempting to access the monitored resource is identified. According to some embodiments, operation 311 is performed by a monitor operating on the device (such as monitor 201 shown in FIG. 2). According to certain embodiments, the monitor is implemented as a code snippet on each of the critical access paths to the monitored resource. Further, according to some embodiments, the identification of the application at operation 311 further comprises collecting information, such as a unique user ID (UID) or process ID (PID) for the application, permission information related to the application, a time stamp associated with the access attempt, or information regarding the monitored resource's and/or application's access history.

According to certain embodiments, following operation 311, the method proceeds to operation 322, where a determination is performed to determine whether the access attempt involves suspicious activity by evaluating a potential risk associated with the application. In some embodiments, operation 322 is performed by a permission monitor (for example, permission monitor 203 in FIG. 2) using information generated or collected by the monitor as part of operation 311. The evaluation of the potential risk can be based on, without limitation, a unique user ID (UID) or process ID (PID) for the application, permission information related to the application, a time stamp associated with the access attempt, information regarding the monitored resource's and/or application's access history or other contextual information regarding the access attempt.

If, at operation 322, it is determined that there is no potential risk associated with the access request, according to certain embodiments, the method proceeds to operation 333, wherein the access request is granted and the application is permitted to access the monitored resource.

If, at operation 322, it is determined that there is a potential risk associated with the access attempt, the method proceeds to operation 344, wherein responsive action is taken. According to certain embodiments, at operation 344, the permission monitor calls a configurator (such as configurator 205 shown in FIG. 2), notifying the configurator of the risk associated with the access attempt. According to some embodiments, as part of operation 344, the configurator provides a GUI to the display, wherein the GUI provides a notification of the access attempt. According to certain embodiments, as part of operation 344, the configurator provides a GUI to the display, and the GUI is configured to receive an input corresponding to a response to the access attempt, such as permitting or denying the application access to the monitored resource. Alternatively, at operation 344, instead of presenting a GUI notifying a user of the access attempt, the configurator may respond to the detected access attempt through the application of one or more predetermined rules. For example, the configurator may automatically block the application's access to the monitored resource.

Although FIG. 3 illustrates operations of one exemplary method for monitoring suspicious application access on an electronic device according to this disclosure, various changes may be made to FIG. 3. For example, operation 301 may be removed from the method in cases where the operating system on the device does not provide any mechanism for a user to revoke or adjust an application's permissions to access a resource apart from uninstalling and reinstalling the application. In such cases, where there is little to no user control over applications' permissions to access resources, it may be reasonable to assume a potential risk attached to all access attempts.

Figure 4:
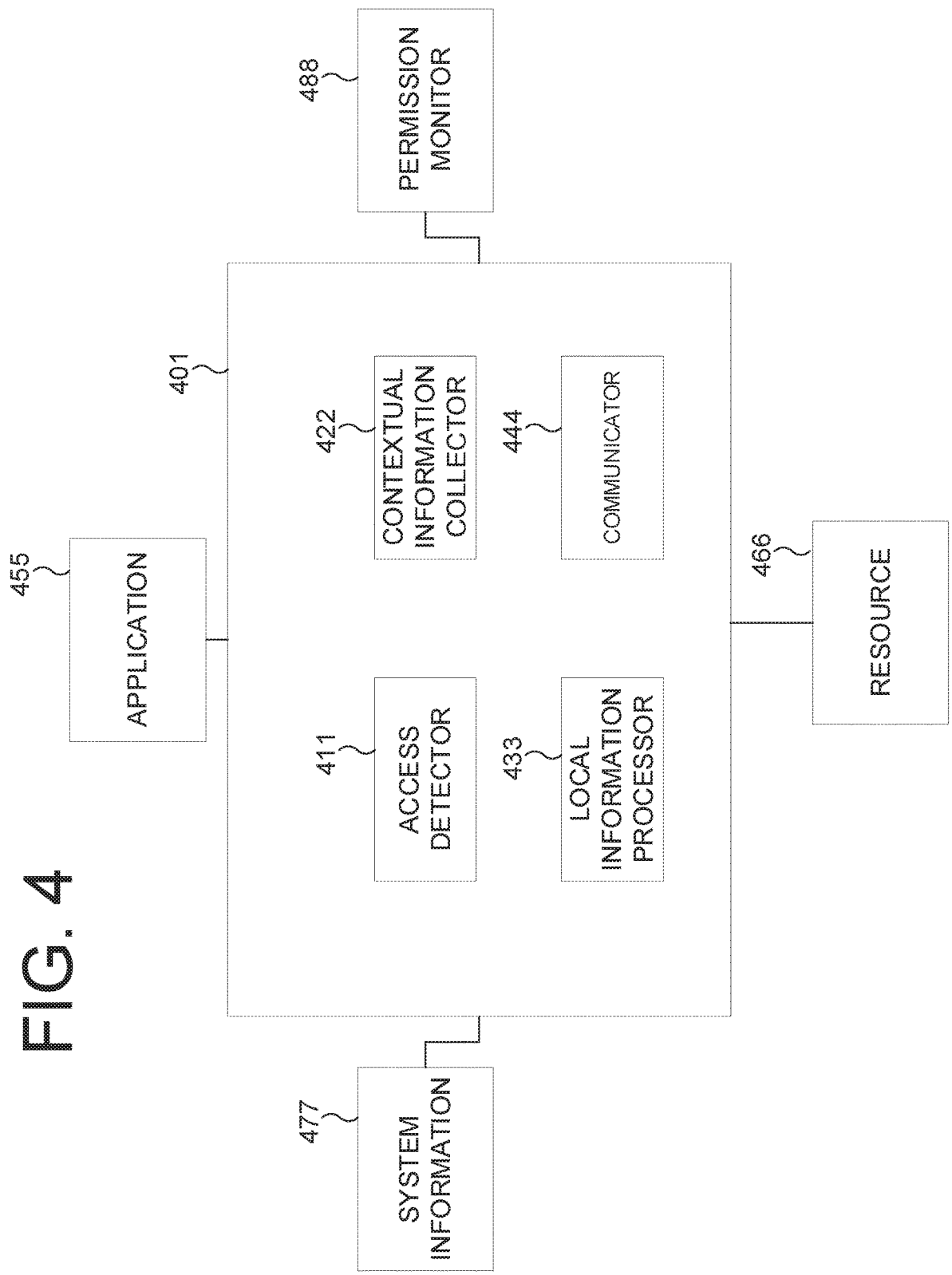
FIG. 4 illustrates an example of a block diagram of a monitor included as part of a system for monitoring suspicious application access according to this disclosure.

FIG. 4 illustrates, in block diagram form, an example of a monitor 401 included as part of a system for monitoring suspicious application access according to certain embodiments of this disclosure. According to certain embodiments, monitor 401 includes access detector 411, contextual information collector 422, local information processor 433, and communicator 444. Certain embodiments of monitor 401 are possible, including embodiments adding or subtracting certain of the components shown in FIG. 4.

Additionally, according to some embodiments, monitor 401 is configured along the critical access path(s) between an application 455 and a monitored resource 466. According to certain embodiments, monitor 401 is one of a plurality of monitors running on a device along critical access paths between applications and monitored resources. Further, according to some embodiments, monitor 401 resides on the critical access path(s) between application 455 and a plurality of monitored resources 466. The present disclosure contemplates a wide range of mappings between application(s), monitor(s) and monitored resource(s).

According to certain embodiments, monitor 401 is provided with access to system information 477, which, in the non-limiting example of FIG. 4, includes system properties information. According to certain embodiments, monitor 401 has access to read permission information for an application stored as part of system information 477. In certain embodiments, system information 477 is stored as a persistent bit map recording the user's choices regarding an application's 455 permissions to access monitored resource(s) 466. As will be discussed in greater detail elsewhere in this disclosure, monitor 401 and a permission monitor (for example permission monitor 501 shown in FIG. 5) may have permission to read system information 477, while a configurator (for example, configurator 701 shown in FIG. 7) is configured to write to system information 477. Monitor 401 can be configured to communicate with a permission monitor 488.

According to certain embodiments, access detector 411 is implemented as software which monitors application activity or application behavior on the critical access path(s) between application 455 and monitored resource 466. According to certain embodiments, access detector 411 is implemented as one or more code snippets on each of the critical access path(s) to the monitored resource 466. According to still certain embodiments, access detector 411 is implemented as hardware.

According to certain embodiments, access detector 411 performs an initial query to determine whether monitoring application 455's access to monitored resource 466 has been enabled or disabled. For example, a user may be able to selectively enable and disable such monitoring through by adjusting settings through a GUI provided by a configurator, such as configurator 701 shown in FIG. 7. As noted above, access detector 411 detects access attempts by application 455 to monitored resource 466. In some embodiments, the detection of access attempts is implemented by detecting the operation of processes of application 455 associated with monitored resource 466. According to some embodiments, when access detector 411 detects the operation of a process associated with monitored resource 466, access detector 411 routes the detected process to contextual information collector 422.

According to some embodiments, contextual information collector 422 collects information indicating the context of the access attempt. Such information includes, without limitation, the identity of the application 455 (for example, the application's UID or PID) attempting to access to monitored resource 466, permission information related to the access, which according to some embodiments can be read from system information 477, and a time stamp for the access attempt.

In some embodiments, the contextual information collected by contextual information collector 422 is passed to local information processor 433. In the example of FIG. 4, local information processor 433 processes the information collected by contextual information collector 422 to determine whether the access attempt involves suspicious activity. In some embodiments, this processing comprises the application of rules or permutations of sets of rules to the contextual information. For example, local information processor 433 can apply a rule flagging an access attempt as suspicious if there is contextual information showing a particular UID associated with the application. Similarly, local information processor 433 can apply a rule flagging an access attempt as suspicious in cases where there is contextual information showing that application 455 has not been opened by a user, and the access attempt is being performed as a background process.

If the processing by local information processor 433 determines that the access attempt is not suspicious, monitor 401 can permit application 455 to access monitored resource 466. According to certain embodiments, this permission is performed by returning the process associated with the access attempt which was detected by access detector 411 to the critical access path for the process. In this way, monitor 401 acts as a checkpoint along the critical access path between application 455 and monitored resource 466.

If, however, the processing by local information processor 433 determines that the access attempt is suspicious, local information processor 433 will, according to certain embodiments, notify communicator 444 and provide the collected contextual information regarding the access attempt and the determination by local information processor that the access attempt was suspicious. In response to receiving a notification from local information processor 433, communicator 444 will call permission monitor 488 to report the access attempt.

Although FIG. 4 illustrates operations of one example of a monitor included as part of a system for monitoring suspicious application access on an electronic device according to this disclosure, various changes may be made to FIG. 4. For example, monitor 401 may be configured to be "always on," thereby eliminating the operation of determining by access detector 411 whether monitor 401 is enabled.

Figure 5:
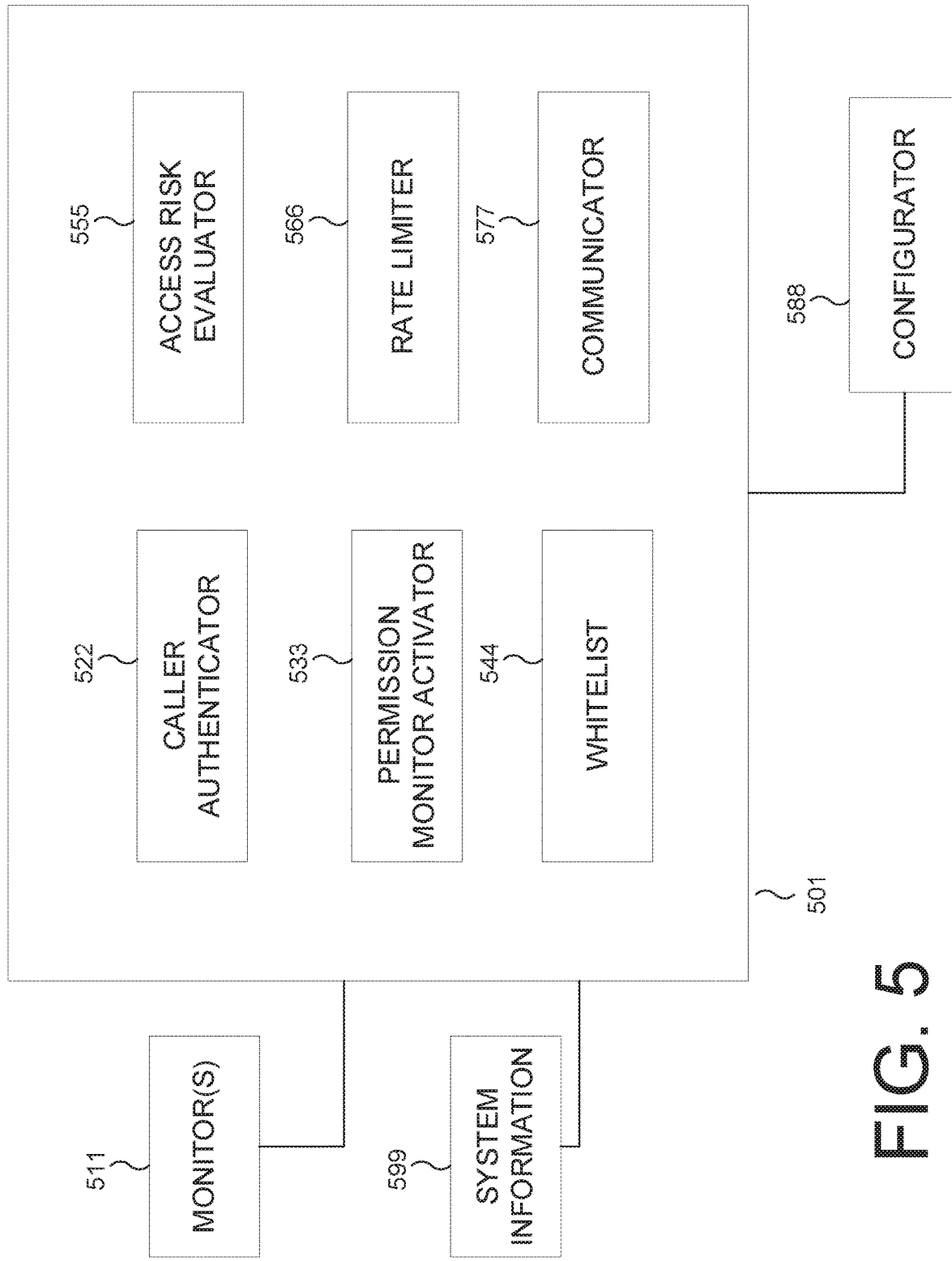
FIG. 5 illustrates an example of a block diagram of a permission monitor included as part of a system for monitoring suspicious application access according to this disclosure.

FIG. 5 illustrates, in block diagram form, an example of a permission monitor 501 included as part of a system for monitoring suspicious application access according to certain embodiments of the present disclosure.

According to certain embodiments, permission monitor 501 is implemented as software, specifically as a system service launched by the device at boot time. Additionally, permission monitor is continuously running and able to accept calls and communications from monitor(s) 511. According to certain embodiments, permission monitor 501 is implemented as hardware, including as part of a system on a chip (SoC) system.

According to the non-limiting example of FIG. 5, the components of permission monitor 501 include caller authenticator 522, permission monitor activator 533, whitelist 544, access risk evaluator 555, rate limiter 566 and communicator 577. Additionally, permission monitor 501 is communicatively connected to configurator 588 and has read access to system information 599.

According to certain embodiments, caller authenticator 522 is configured to perform an analysis as to verify the identity of the caller to permission monitor 501. Depending on the device and operating system, a malicious application may attempt to "spoof" systems for monitoring suspicious application access according to this disclosure by presenting a call to a permission monitor regarding access request, which appears to originate from an actor other than the malicious application. According to certain embodiments, caller authenticator 522 authenticates the call to permission monitor 501 received from monitor 511 and confirms that the call to permission monitor 501 was received from an actor authorized to call permission monitor 501. This authentication can be based on a UID associated with the application. Depending on the operating system used by the device, it may be difficult or impossible to "spoof" a UID, or UIDs having certain characteristics have indicia of trustworthiness. For example, in devices using the Android operating system, the UID of a caller may be checked via a binder, such as "getCallingUid." Where the UID has a value of less than 10,000, this indicates that the caller is an application pre-loaded onto the device, such as a monitor or an application associated with a monitor, and thus inherently more trustworthy than an application having a UID of 10,000 or greater.

In cases where caller authenticator 522 is unable to authenticate the caller, the call is ignored, and the application will not be able to access the monitored resource. However, when caller authenticator 522 is able to authenticate the caller to permission monitor 501, according to some embodiments, permission monitor activator 533 performs a determination as to whether permission monitoring of the application's access attempts to the given resource has been activated. To perform this determination, permission monitor activator 533 can read the system information 599 for the application to determine whether monitoring has been activated. In the non-limiting example of FIG. 5, system information 599 includes system properties information.

According to certain embodiments, where permission monitor activator 533 confirms that permission monitoring for the given application has been activated, whitelist 544 performs a further analysis of the access attempt based on the information provided to process monitor 501 as part of an authenticated call from monitor 511. According to certain embodiments, whitelist 544 operates to allow the application to access the monitored resource if certain criteria are satisfied. Such criteria include whether the application seeking access to the monitored resource is a pre-loaded application or whether the application belongs to a predefined list of trusted applications. According to certain embodiments, the predefined list of trusted applications is set according to a policy of the device manufacturer. Alternatively, according to some embodiments, after an access attempt pass review by whitelist 544, the access attempt is further reviewed by access risk evaluator 555.

According to some embodiments, access risk evaluator 555 operates as a process of permission monitor 501 to determine, based on the context and/or states of the application attempting access to a monitored resource, the potential risk of the access being requested. For example, access risk evaluator 555 can check whether the application has any threads running in the foreground of the device, whether the screen of the device is off or whether the screen or device itself is locked. In cases where access risk evaluator 555 determines the extent to which the context of the access request presents a potential risk. For example, access risk evaluator 555 can determine that an application's request to access the device's camera while the device itself is in a locked state presents a significant potential risk.

According to certain embodiments, rate limiter 566 operates to deny an application access to a monitored resource if the access attempt satisfies certain criteria. For example, rate limiter 566 can operate to deny or ignore an application's access attempt if the same type of access has been reported within a certain period of time. For example, rate limiter 566 can permit a social media application to occasionally access a device's location information, but to deny repeated accesses to this information, lest the application unwantedly operate as a tracker of a user's location.

According to certain embodiments, communicator 577 operates to send the outputs from access risk evaluator 555 and rate limiter 566 to configurator 588. Depending on the operating system utilized by the device, communicator 577 can communicate with configurator 588 by sending configurator 588 an intent containing information about the application attempting access, information about the permissions for the application and/or the monitored resource, and contextual information regarding the access intent. Further, according to certain embodiments, the intent sent by communicator 577 to configurator 588 is an explicit intent, restricting the configurator as the receiver of the intent.

Although FIG. 5 illustrates components of one example of a permission monitor included as part of a system for monitoring suspicious application access on an electronic device according to this disclosure, various changes may be made to FIG. 5. For example, whitelist 544 may be omitted or incorporated within access risk evaluator 555.

Figure 6:
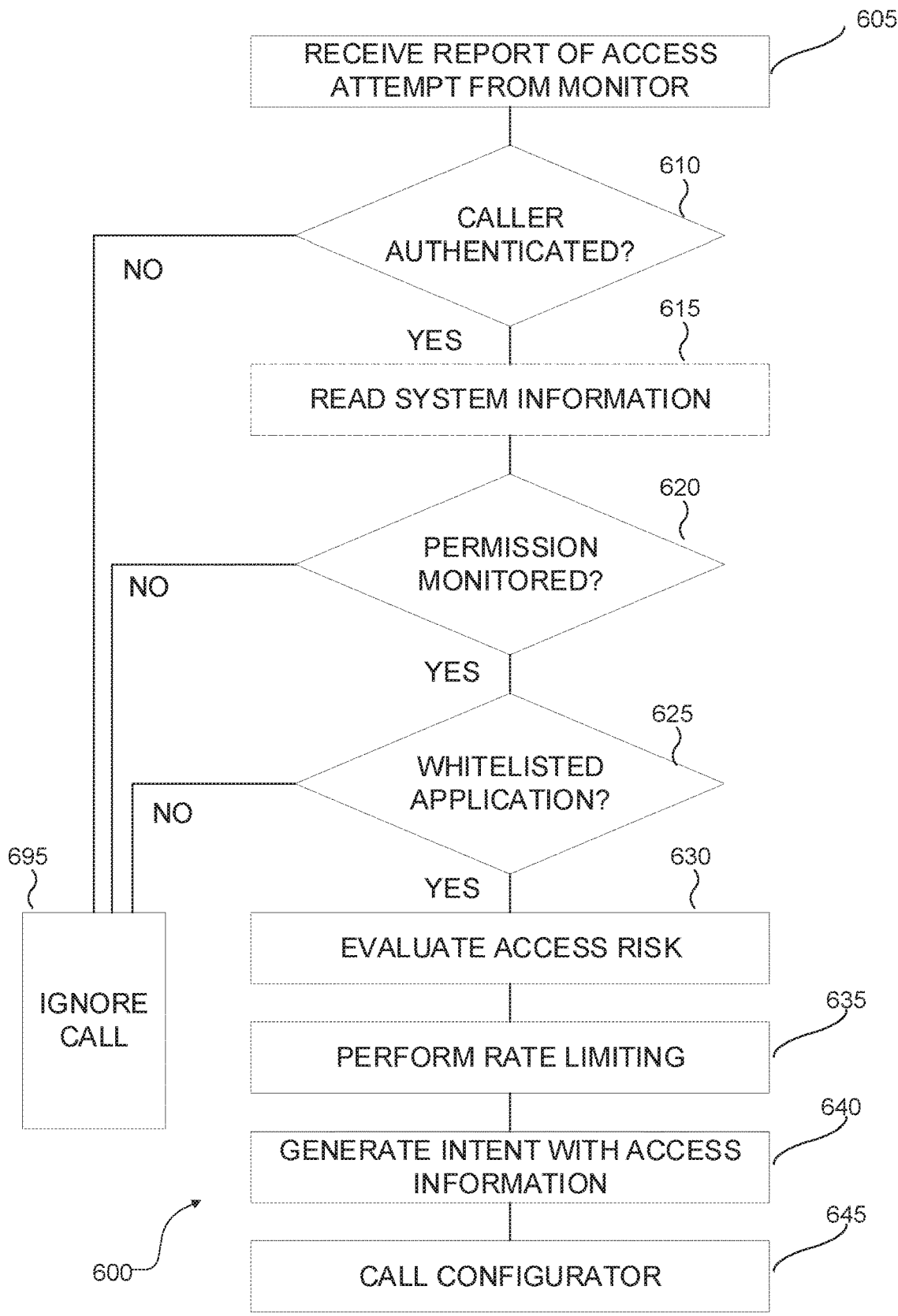
FIG. 6 illustrates an example of a flowchart showing operations performed as part of a method for monitoring suspicious application access according to this disclosure.

FIG. 6 illustrates, in flowchart form, operations performed by a permission monitor in a method 600 for monitoring suspicious application access according to this disclosure.

In the non-limiting example of FIG. 6, method 600 begins with operation 605, wherein a permission monitor, such as permission monitor 501 shown in FIG. 5, receives, from a monitor (such as monitor 401 shown in FIG. 4) a call reporting an application attempting to access one or more monitored resources.

According to certain embodiments, method 600 then proceeds to operation 610, in which a determination of whether the received call is authentic, or from an application "spoofing," or pretending to be, an application authorized to call the permission monitor, such as a monitor. The determination performed at operation 610 can be based on criteria, which depending on the operating system of the device, may be difficult to "spoof," such as an application's unique ID ("UID"). Certain embodiments are possible, wherein authentication is performed based on a different indicia, such as a process ID ("PID") associated with the call.

If, at operation 610, the caller to the permission monitor cannot be authenticated, the process moves to operation 695, and the permission monitor ignores the call.

If, however, the caller to the permission monitor is authenticated, according to certain embodiments, method 600 advances to operation 615, wherein the permission monitor reads system property information from a configuration file to confirm the current permissions for the application attempting access to the monitored resource. According to certain embodiments, system information are stored locally with the permission monitor, and method 600 proceeds to operation 620.

According to certain embodiments, at operation 620, a determination is performed as to whether access attempt involves an application or a resource for which permission is monitored. According to certain embodiments, monitoring is persistent and universal, and operation 620 may be avoided.

If, at operation 620, a determination is made that the application is not an application whose permission to access a resource is monitored, or that the resource is not a resource for which permission to access is monitored, or that the combination of application and resource presented by the access attempt is not one for which permission is monitored, method 600 may proceed to operation 695, wherein the call to the permission monitor is ignored. According to some embodiments and depending on configuration, this results in the application being denied access to the resource.

If, at operation 620, a determination is made that the combination of application and/or resource presented by the access attempt is one for which permission is monitored, method 600 advances to operation 625, wherein a determination is performed as to whether the application attempting to access the monitored resource is a whitelisted application.

If, at operation 625, it is determined that the application is not a whitelisted application, method 600 advances to operation 695, wherein the call to the permission monitor is ignored. According to some embodiments and depending on configuration, this results in the application being denied access to the resource. If, at operation 625 it is determined that the application is a whitelisted application, method 600 proceeds to operation 630.

According to certain embodiments, at operation 630, the permission monitor, or a component thereof (such as access risk evaluator 555 shown in FIG. 5), evaluates the risk to the device user's privacy or security associated with the access attempt based on, without limitation, contextual information regarding the access attempt. Contextual information includes, without limitation, the current status of the device (e.g., "is the screen on?", "Is the device locked?", or "Is Wi-Fi connectivity turned on?") and one or more user privacy preferences. Further examples of contextual information include device integrity status (for example, whether preloaded official software, including the OS, has been modified), battery level, device location, type of wireless connectivity (e.g., cellular network, Bluetooth, Wi-Fi, or NFC), currently running applications and services, user interactions, current time, a usage history for the device, information from built-in sensors of the device (for example, accelerometers and gyroscopes) and user privacy preferences stored in a settings file. According to certain embodiments, user privacy preferences can be set in response to a notification from one or more components of a system for monitoring suspicious application access (such as configurator 205 shown in FIG. 2). According to some embodiments, the relevant user privacy preferences can be set at the time the application is installed on the device, or in response to a request from the application at a post-installation runtime. At operation 630, the permission monitor and/or a component thereof, outputs its determination of the potential risk associated with the access attempt. According to some embodiments, the output can be represented as a number, a string and/or a bitmap.

According to certain embodiments, subsequent to operation 630, method 600 proceeds to operation 635. At operation 635, a permission monitor or one or more components thereof performs rate limiting on the application. According to some embodiments, at operation 635, a permission monitor determines the time interval since the application last attempted to access the monitored resource, and if the time interval is less than a threshold value, causes the permission monitor to ignore the application's access attempt or otherwise denies the application's access attempt. By ignoring reports within a specified time period, the performance of a device may be optimized, in that processing and battery resources are not wasted generating redundant access reports for multiple instances of the same suspicious access attempt.

According to certain embodiments, subsequent to operation 635, method 600 proceeds to operation 640, wherein the permission monitor or one or more components thereof (such as communicator 577 shown in FIG. 5) generates an intent reporting the access attempt. The generated intent can, depending on embodiments, include additional information associated with the access attempt, including without limitation, information regarding the application performing the access attempt, information regarding the permissions for the application and/or the monitored resource, and contextual information regarding the access attempt. By ignoring a Finally, according to certain embodiments, method 600 proceeds to operation 645, wherein the permission monitor or one or more components thereof (such as communicator 577 shown in FIG. 5) calls a configurator (such as configurator 701 shown in FIG. 7) and sends the generated intent to the configurator. According to some embodiments and depending on the operating system used by the device, the generated intent is an explicit intent to be received only by a configurator.

Although FIG. 6 illustrates operations of one example of method for monitoring suspicious application access on an electronic device according to this disclosure, various changes may be made to FIG. 6. For example, the sequence of operations shown in FIG. 6 may be reordered and steps added or omitted. As previously noted, operation 615 may, depending on embodiments, be omitted. Additionally, for example, operations 625, 630 and 635 may be performed in a different order than shown in FIG. 6. Numerous variations are possible.

Figure 7:
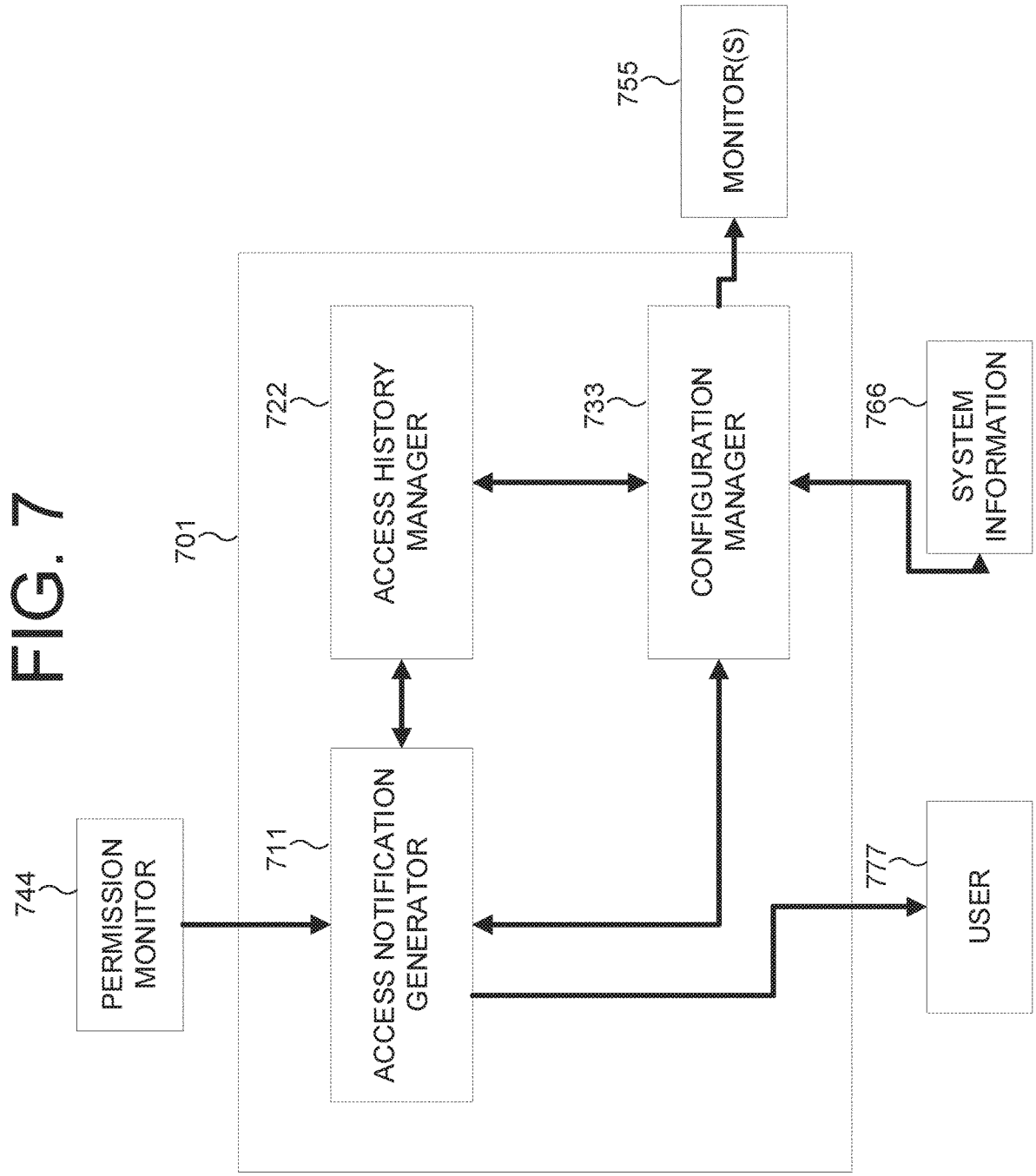
FIG. 7 illustrates an example of a block diagram of a configurator included as part of a system for monitoring suspicious application access according to this disclosure.

FIG. 7 illustrates, in block diagram format, an example of a configurator 701 included as part of a system for monitoring suspicious application access according to this disclosure.

In the non-limiting example of FIG. 7, the components of configurator 701 include access notification generator 711, access history manager 722 and configuration manager 733. Further, as shown in FIG. 7, configurator 701 can be connected to a permission monitor 744, a monitor 755, system information 766 and a user 777.

According to certain embodiments, configurator 701 is configured to receive calls, from permission monitor 744 reporting attempts by applications to access monitored resources, which permission monitor 744 has determined to involve suspicious activity and/or present a potential risk associated with the application accessing the monitored resource. According to some embodiments, upon receipt of a call reporting a suspicious access attempt, access notification generator 711 presents a visible notification to a user 777 notifying them that a suspicious access attempt has been performed. According to certain embodiments, presenting a visible notification to user 777 comprises providing a graphical user interface (GUI) to the user. In addition to reporting the fact of the suspicious access attempt, the GUI also can be configured to receive, from user 777 an input selecting a response to the suspicious access attempt. Selected responses can include providing the application with a one-time permission to access the resource, performing a one-time denial of access, or updating a permission setting associated with the application and/or resource.

According to certain embodiments, access notification generator 711 provides an audible notification of the suspicious access attempt, such as a "beep." Other forms of notifications, such as haptic notifications, (e.g., a vibration), or a transmission to a connected device (such as a computer or smart watch).

According to certain embodiments, access notification generator 711 interfaces with access history manager 722. According to certain embodiments, access history manager 722 stores and maintains a history of an application's access attempts to a particular resource as reported to configurator 701 by permission monitor 744. According to some embodiments, a GUI provided by access notification generator 711 includes information showing access history information maintained by access history manager 722. For example, access history manager 722 can maintain information showing that a particular application has repeatedly attempted to access a device's microphone while the device is in a locked state. Such contextual information can be useful to a user trying to understand the significance and risk associated with an access attempt.

Further, according to some embodiments, configurator 701 includes configuration manager 733. Configuration manager 733 can, depending on embodiments, interface with monitor 755 and/or write to system information 766 to allow a user to turn a suspicious application access monitor on or off for the whole device, for a particular permission, for a particular resource, or for an application. According to some embodiments, configuration manager 733 receives inputs turning a monitor on or off from a GUI provided by access notification generator 711.

Although FIG. 7 illustrates of one example of a configurator included in a system for monitoring suspicious application access on an electronic device according to this disclosure, various changes may be made to FIG. 7. For example, configuration manager 733 may be configured to turn monitors on according to predefined rules or user-indicated logic, rather than in response to specific instructions turning a particular monitor on or off. For example, a user may indicate a general preference for a high level of security, and configuration manager may, based on predefined rules or application logic, configure and activate a set of particular monitors.

Figure 8:
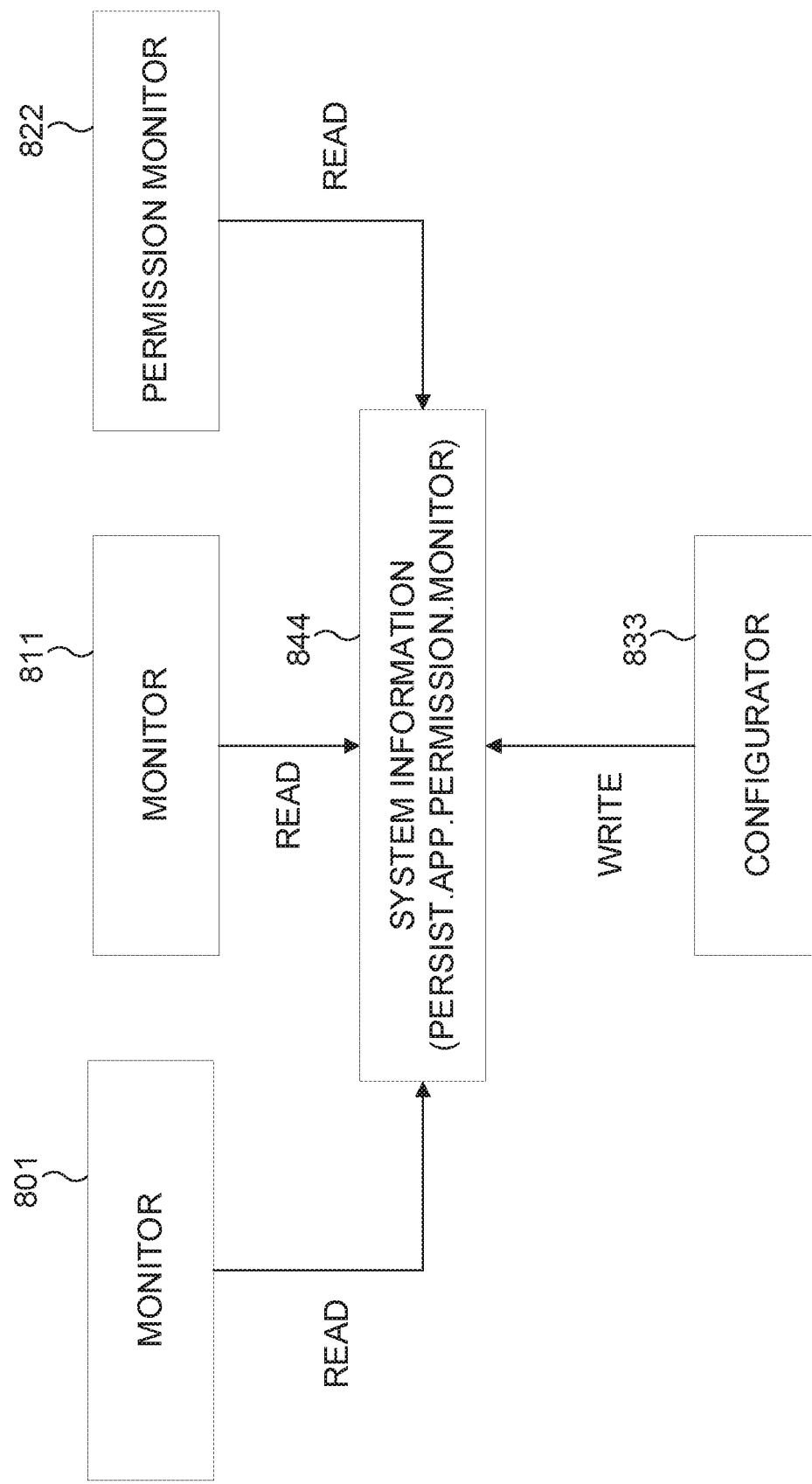
FIG. 8 illustrates an example of a block diagram showing management of application permission monitoring settings using system property information according to this disclosure.

FIG. 8 illustrates, in block diagram format, management of application permission monitoring settings using system information according to this disclosure. In the non-limiting example of FIG. 8, the components a system for monitoring suspicious application access include a plurality of monitors 801 and 811 (such as monitor 201 shown in FIG. 2), a permission monitor 822 (such as permission monitor 501 shown in FIG. 5) and a configurator 833 (such as configurator 701 shown in FIG. 7). In the example of FIG. 8, each of monitor 801, monitor 811 and permission monitor 822 has permission to read system information 844. By the same token, configurator 833 has permission to write to system information 844. According to certain embodiments, system information 844 includes system properties information.

According to certain embodiments, configuration information (including, without limitation, permission settings, rules, and monitor activation settings for the system for monitoring suspicious application access) is stored within system information 844 as a bitmap designated "Persist.app.permission.monitor." According to certain embodiments, system information 844 is configured such that, for each application, a flag is set, the flag indicating whether the application's attempt to access a particular resource is to be reported.

Although the present disclosure has been described with exemplary embodiments, various changes and modifications may be suggest to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An apparatus for resource access monitoring comprising:
a display;
a processor coupled to the display; and
a memory coupled to the processor, the memory comprising instructions executable by the processor to:
identify an access attempt to a monitored resource by an application, the identification occurring after an access permission check is performed,
implement a monitor on a critical access path to the monitored resource, the monitor configured to identify the access attempt to the monitored resource by the application,
implement a permission monitor, the permission monitor configured to receive, via the monitor, a call reporting the access attempt to the monitored resource by the application,
authenticate the call to the permission monitor by a caller authenticator,
responsive to the caller authenticator authenticating the call to the permission monitor, determine whether the access attempt involves suspicious activity by evaluating a potential risk associated with the application accessing the monitored resource, and
in response to determining that the access attempt involves suspicious activity, provide a graphical user interface (GUI) to the display, the GUI providing a notification of the access attempt.

2. The apparatus of claim 1, further comprising:
the memory comprising instructions executable by the processor to:
collect context information associated with the access attempt, and
determine whether the access attempt involves suspicious activity based in part on the collected context information.

3. The apparatus of claim 1, wherein the permission monitor is configured to implement at least one of a whitelist, an access risk evaluator, a rate limiter or a communicator.

4. The apparatus of claim 1, further comprising instructions executable by the processor to:
implement a configurator, the configurator configured to receive, from the permission monitor, a notification of the access attempt by the application,
wherein the configurator is configured, in response to receiving the notification, to perform at least one of permitting the application to access to the monitored resource, blocking the application from accessing the monitored resource or generating the GUI providing a notification of the access attempt.

5. The apparatus of claim 1, further comprising instructions executable by the processor to:
implement a second monitor on a critical access path to a second monitored resource,
identify, after a second access permission check is performed, a second access attempt to a second monitored resource by a second application,
transmit, from the second monitor to the permission monitor, a second call reporting a second access attempt, the second access attempt performed by the second application attempting to access the second monitored resource, and
determine whether the second access attempt involves suspicious activity by evaluating a potential risk associated with the second application accessing the monitored resource.

6. The apparatus of claim 2, wherein the context information comprises at least one of a unique user ID (UID) of the application, the application's process ID (PID), permission information related to the application, a time stamp, or an access history of the application.

7. A method for monitoring resource access comprising:
performing an identification, by a processor connected to a memory and a display, of an access attempt to a monitored resource by an application, the identification being performed after an access permission check is performed;
implementing a monitor on a critical access path to the monitored resource, the monitor configured to identify the access attempt to the monitored resource by the application;
implementing a permission monitor, the permission monitor configured to receive, via the monitor, a call reporting the access attempt to the monitored resource by the application;
authenticating the call to the permission monitor by a caller authenticator;
responsive to the caller authenticator authenticating the call to the permission monitor, determining whether the access attempt involves suspicious activity by evaluating a potential risk associated with the application accessing the monitored resource; and
in response to determining that the access attempt involves suspicious activity, providing a graphical user interface (GUI) to the display, the GUI providing a notification of the access attempt.

8. The method of claim 7, further comprising:
collecting context information associated with the access attempt; and
determining whether the access attempt involves suspicious activity based in part on the collected context information.

9. The method of claim 7 further comprising:
implementing, by the permission monitor, at least one of a whitelist, an access risk evaluator, a rate limiter or a communicator.

10. The method of claim 7 further comprising:
implementing a configurator, the configurator configured to receive, from the permission monitor, a notification of the access attempt by the application,
wherein the configurator is configured, in response to receiving the notification, to perform at least one of permitting the application to access to the monitored resource, blocking the application from accessing the monitored resource or generating the GUI providing a notification of the access attempt.

11. The method of claim 7 further comprising:
implementing a second monitor on a critical access path to a second monitored resource;
identifying, after a second access permission check is performed, a second access attempt to a second monitored resource by a second application;
transmitting, from the second monitor to the permission monitor, a second call reporting a second access attempt, the second access attempt performed by the second application attempting to access the second monitored resource; and
determining whether the second access attempt involves suspicious activity by evaluating a potential risk associated with the second application accessing the monitored resource.

12. The method of claim 8, wherein the context information comprises at least one of a unique user ID (UID) of the application, the application's process ID (PID), permission information related to the application, a time stamp, or an access history of the application.

13. A non-transitory computer-readable medium comprising program code, that when executed by a processor, causes a system to:
identify an access attempt to a monitored resource by an application, the identification occurring after an access permission check is performed,
implement a monitor on a critical access path to the monitored resource, the monitor configured to identify the access attempt to the monitored resource by the application,
implement a permission monitor, the permission monitor configured to receive, via the monitor, a call reporting the access attempt to the monitored resource by the application,
authenticate the call to the permission monitor by a caller authenticator,
responsive to the caller authenticator authenticating the call to the permission monitor, determine whether the access attempt involves suspicious activity by evaluating a potential risk associated with the application accessing the monitored resource, and
in response to determining that the access attempt involves suspicious activity, provide a graphical user interface (GUI) to a display, the GUI providing a notification of the access attempt.

14. The non-transitory computer-readable medium of claim 13, further comprising code, that when executed by the processor, causes the system to:
collect context information associated with the access attempt; and
determine whether the access attempt involves suspicious activity based in part on the collected context information.

15. The non-transitory computer-readable medium of claim 13, wherein the permission monitor is configured to implement at least one of a whitelist, an access risk evaluator, a rate limiter or a communicator.

16. The non-transitory computer-readable medium of claim 13, further comprising code, that when executed by the processor, causes the system to:
implement a configurator, the configurator configured to receive, from the permission monitor, a notification of the access attempt by the application,
wherein the configurator is configured, in response to receiving the notification, to perform at least one of permitting the application to access to the monitored resource, blocking the application from accessing the monitored resource or generating the GUI providing a notification of the access attempt.

17. The non-transitory computer-readable medium of claim 13, further comprising code, that when executed by the processor, causes the system to:
- implement a second monitor on a critical access path to a second monitored resource,
- identify, after a second access permission check is performed, a second access attempt to a second monitored resource by a second application,
- transmit, from the second monitor to the permission monitor, a second call reporting a second access attempt, the second access attempt performed by the second application attempting to access the second monitored resource, and
- determine whether the second access attempt involves suspicious activity by evaluating a potential risk associated with the second application accessing the monitored resource.

* * * * *